United States Patent [19]
Cochran

[11] Patent Number: 5,560,220
[45] Date of Patent: Oct. 1, 1996

[54] METHOD FOR TESTING AN EARTH TAP HEAT EXCHANGER AND ASSOCIATED APPARATUS

[75] Inventor: Robert W. Cochran, Lakeland, Fla.

[73] Assignee: ECR Technologies, Inc., Lakeland, Fla.

[21] Appl. No.: 523,026

[22] Filed: Sep. 1, 1995

[51] Int. Cl.[6] ................... F28F 11/00; F24J 3/08
[52] U.S. Cl. .................. 62/260; 165/45; 165/DIG. 2
[58] Field of Search .................. 62/260, 324.1; 165/11.1, 11.2, 70, 137.1, DIG. 2, DIG. 3, DIG. 8, 45

[56] References Cited

U.S. PATENT DOCUMENTS

| | | | |
|---|---|---|---|
| 3,882,937 | 5/1975 | Robinson | 166/267 |
| 4,171,721 | 10/1979 | Movick | 165/45 |
| 4,255,936 | 3/1981 | Cochran | 62/238.7 |
| 4,286,651 | 9/1981 | Steiger et al. | 165/45 |
| 4,325,228 | 4/1982 | Wolf | 62/260 |
| 4,466,481 | 8/1984 | Wilson et al. | 165/70 |
| 4,512,156 | 4/1985 | Nagase | 60/641.2 |
| 4,573,327 | 3/1986 | Cochran | 62/238.6 |
| 4,665,716 | 5/1987 | Cochran | 62/503 |
| 4,671,351 | 6/1987 | Rappe | 165/133 |
| 4,714,108 | 12/1987 | Barry | 165/45 |
| 4,970,902 | 11/1990 | Ninomiya | 165/70 |
| 5,022,459 | 6/1991 | Chiles et al. | 165/11.1 |

FOREIGN PATENT DOCUMENTS

| | | |
|---|---|---|
| 2911425 | 9/1980 | Germany. |
| 3015149A1 | 10/1981 | Germany. |
| 3022588A1 | 12/1981 | Germany. |
| 3203-526-A | 5/1983 | Germany. |
| 3142347A1 | 5/1983 | Germany. |
| 57-187557 | 5/1981 | Japan. |

Primary Examiner—Henry A. Bennett
Assistant Examiner—William C. Doerrler
Attorney, Agent, or Firm—Allen, Dyer, Doppelt, Franjola & Milbrath, P.A.

[57] ABSTRACT

A method for identifying a leaking earth tap heat exchanger includes measuring an electrical resistance between the electrically conducting tubing of the earth tap heat exchanger and the surrounding soil or water to determine if the electrically insulating layer has an undesired opening in a portion thereof thereby exposing an adjacent portion of the electrically conducting tubing to the soil or water as indicated by a relatively low electrical resistance. Each earth tap heat exchanger preferably comprises electrically conducting tubing having an electrically insulating layer covering an exterior thereof. The method may also be used to test the integrity of the electrically insulating layer to avoid corrosion as may be caused by direct contact between metallic tubing and adjacent soil or water. Apparatus aspects of the invention are also disclosed.

32 Claims, 2 Drawing Sheets

METHOD FOR TESTING AN EARTH TAP HEAT EXCHANGER AND ASSOCIATED APPARATUS

FIELD OF THE INVENTION

The present invention relates to field of heating and air conditioning, and, more particularly, to a method and related apparatus for testing an earth tap heat exchanger.

BACKGROUND OF THE INVENTION

Heat pumps have become increasing popular because of the energy efficiency in transferring rather than creating heat. A heat pump typically includes a compressor which circulates refrigerant through a first heat exchanger or condenser, through an expansion valve or opening, through a second heat exchanger or evaporator, and into a refrigerant storage device or accumulator. Vapor is withdrawn from the storage device for recirculation by the compressor. A heat pump can commonly be operated in either a heating or cooling mode by selective activation of a reversing valve.

In preferred operation, the refrigerant vapor is fully condensed to liquid at the exit of the condenser. In addition, the refrigerant is preferably fully vaporized at the exit of the evaporator as disclosed in U.S. Pat. Nos. 4,573,327 and 4,665,716, both to Cochran and assigned to the assignee of the present invention. These patents further describe significant advances in the area of control of refrigerant flow using a charge control device in place of a conventional accumulator, and a float-type liquid control valve connected between the first and second heat exchangers to thereby enhance control of refrigerant flow and increase energy efficiency.

Air source heat pumps which exchange heat with ambient air have been most common because of their generally low initial cost. Another type of heat pump is the ground-coupled heat pump which transfers heat with the ground through a heat exchanger commonly called an earth loop or earth tap. A ground-coupled heat pump is typically more efficient than an air source heat pump because the earth temperature may be more stable than ambient air.

Among the ground-coupled heat pumps are the direct expansion and closed loop type. The closed loop heat pump typically includes an intermediate fluid, such as an antifreeze solution, which is circulated between one or more buried conduits and a heat exchanger as disclosed in U.S. Pat. No. 4,325,228. In other words, an extra stage of heat exchange is required in the closed loop heat pump.

The direct expansion heat pump circulates refrigerant directly through an earth tap heat exchanger and may be more efficient than a closed loop heat pump. The term direct expansion derives from the evaporation and expansion of the liquid refrigerant to vapor in the buried heat exchanger. In addition, the direct expansion heat pump does not require pumping of an intermediate fluid as does the closed loop heat pump. A ground-coupled direct expansion heat pump may require a relatively large amount of refrigerant compared with an air-source heat pump or a closed loop heat pump.

Direct expansion heat pumps have used a U-shaped earth tap heat exchanger, including two parallel conduits joined in fluid communication at their lower ends, and wherein one conduit carries liquid and the other vapor. Coaxial or concentric tubes for liquid and vapor refrigerant have also been used as disclosed, for example, in German Pat. No. 3,203,526A. Typically a layer of insulation is provided between the coaxial tubes.

Conventional earth taps typically include tubing comprising copper or other metallic materials to provide the vapor and liquid carrying passageways. Unfortunately, copper, for example, may form an oxide layer in most soil conditions. Such an oxide layer may decrease the thermal transfer capacity of the tube. In addition, advanced corrosion may cause an opening in the tube thereby leaking refrigerant into the soil. Accordingly, copper tubing for an earth tap typically requires a relatively large wall thickness beyond what is needed for the typical operating pressures. In addition, the integrity of an earth tap heat exchanger may be checked only by cumbersome pressure testing procedure after installation to thereby ensure that no damage has occurred to the tubes during installation.

Since many earth taps are typically connected to a common manifold, each must be individually checked by pressurizing the tube and detecting a loss of pressure to identify the leaking earth tap. The leaking earth tap heat exchanger may then be repaired or replaced. In other words, checking the integrity of a plurality of earth taps may be time consuming and difficult. Accordingly, the cost and complexity of installing and maintaining an earth tap heat exchanger may be relatively high.

SUMMARY OF THE INVENTION

In view of the foregoing background, it is therefore an object of the present invention to provide a method and associated earth tap heat exchanger which may be quickly and accurately checked for integrity and/or leakage, and which is also resistant to corrosion.

These and other objects, features and advantages of the present invention are provided by a method for testing the integrity of an earth tap heat exchanger by measuring an electrical resistance between the electrically conducting tubing of the earth tap heat exchanger and the surrounding soil or water. The electrical resistance may be used to determine if the electrically insulating layer has an undesired opening in a portion thereof thereby exposing an adjacent portion of the electrically conducting tubing to the soil or water as indicated by a relatively low electrical resistance. Each earth tap heat exchanger preferably comprises electrically conducting tubing having an electrically insulating layer covering an exterior thereof and being positioned in the soil or water. The measuring of the electrical resistance may be repeated for each of the earth tap heat exchangers.

An opening in a portion of the electrically insulating layer indicates that a leak has occurred or that the underlying tubing is exposed to the soil or water and may be subject to corrosion. If a leak in the heat pump apparatus has already been determined, such as indicated by a loss of refrigerant, and only one earth tap exhibits low resistance, the leaking earth tap is identified by the low resistance. If several earth taps have low resistance, it may be desirable to repair or replace each or pressure test each such earth tap heat exchanger to identify the leaking earth tap. In either case, the task of identifying the leaking earth tap is facilitated by the resistance measuring of the present invention.

The integrity of the protective electrically insulating layer is of interest in performing maintenance testing or upon completing an initial installation. If the integrity of the electrically insulating layer is compromised, a leak may be indicated or corrosion of metallic tubing may be accelerated leading to premature failure.

The step of measuring the electrical resistance preferably comprises electrically connecting a conventional resistance measuring meter or ohm-meter between an electrical ground and the electrically conducting tubing of an earth tap heat exchanger being measured. The method also preferably includes the step of electrically isolating the electrically conducting tubing of the earth tap heat exchanger from other portions of the heat pump apparatus before the step of measuring the electrical resistance. In addition, the step of electrically isolating the electrically conducting tubing preferably comprises positioning a dielectric coupling between the electrically conducting tubing and an adjacent fluid line. Alternately, a switch or ground link may be opened to electrically isolate the heat pump apparatus from electrical ground, thereby permitting measuring of the electrical resistance of the earth tap heat exchangers.

Another method aspect of the present invention is for installing a heat pump apparatus and comprises the steps of: providing at least one earth tap heat exchanger comprising electrically conducting tubing having an electrically insulating layer covering an exterior thereof; positioning the earth tap heat exchanger in soil or water; and connecting the earth tap heat exchanger in fluid communication with associated fluid lines and being electrically isolatable therefrom. Dielectric couplings may be used to operatively connect the electrically conducting tubing of the earth tap heat exchanger and the adjacent fluid lines. Alternatively, a switch or removable link may be used to connect the heat pump apparatus to an electrical ground. The switch or link may be opened to provide electrical isolation during measuring of the electrical resistance of an earth tap.

The present invention is preferably implemented in a ground-coupled direct expansion heat pump apparatus. The apparatus preferably includes: a first heat exchanger; at least one earth tap heat exchanger comprising electrically conductive tubing and an electrically insulating layer covering an exterior thereof; and electrical isolation means for electrically isolating the earth tap heat exchanger. The electrical isolation means may be provided by dielectric coupling means connecting the earth tap heat exchanger in fluid communication with associated fluid lines while electrically isolating the earth tap heat exchanger therefrom. Alternately, the electrical isolation means may be a switch or movable link for electrically isolating the heat pump apparatus from an electrical ground. In other words, the electrical ground connection to the apparatus may be permanently or temporarily opened to electrically isolate an earth tap heat exchanger.

The earth tap heat exchanger may further comprise electrical contact means for facilitating electrical connection to the electrically conducting tubing. Accordingly, measuring an electrical resistance between the electrically conducting tubing and the soil is facilitated. The heat pump apparatus preferably further comprises a resistance measuring meter that may be temporarily or permanently connected between an electrical ground and the electrical contact means. The resistance measurement permits determining, based upon a relatively low measured electrical resistance, that a portion of the electrically insulating layer has been disturbed or penetrated and thereby indicating a leak or indicating that the electrically conducting tubing is exposed.

The electrically insulating layer of the earth tap heat exchanger is preferably a varnish, rubber, polymer, copolymer or other plastic being relatively thin so as to permit thermal conduction between surrounding soil and underlying portions of the electrically conductive tubing. The insulating layer is also preferably readily applied to electrically conducting tubing, such as copper, and is preferably chemically resistant, as well as abrasion resistant to withstand positioning in soil or water.

BRIEF DESCRIPTION OF THE DRAWINGS

FIG. 4 a schematic diagram illustrating a portion of an alternate embodiment of the heat pump apparatus according to the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicant provides these embodiments so that this disclosure will be thorough and complete, and will fully convey the scope of the invention to those skilled in the art. Like numbers refer to like elements throughout.

Figure 1:
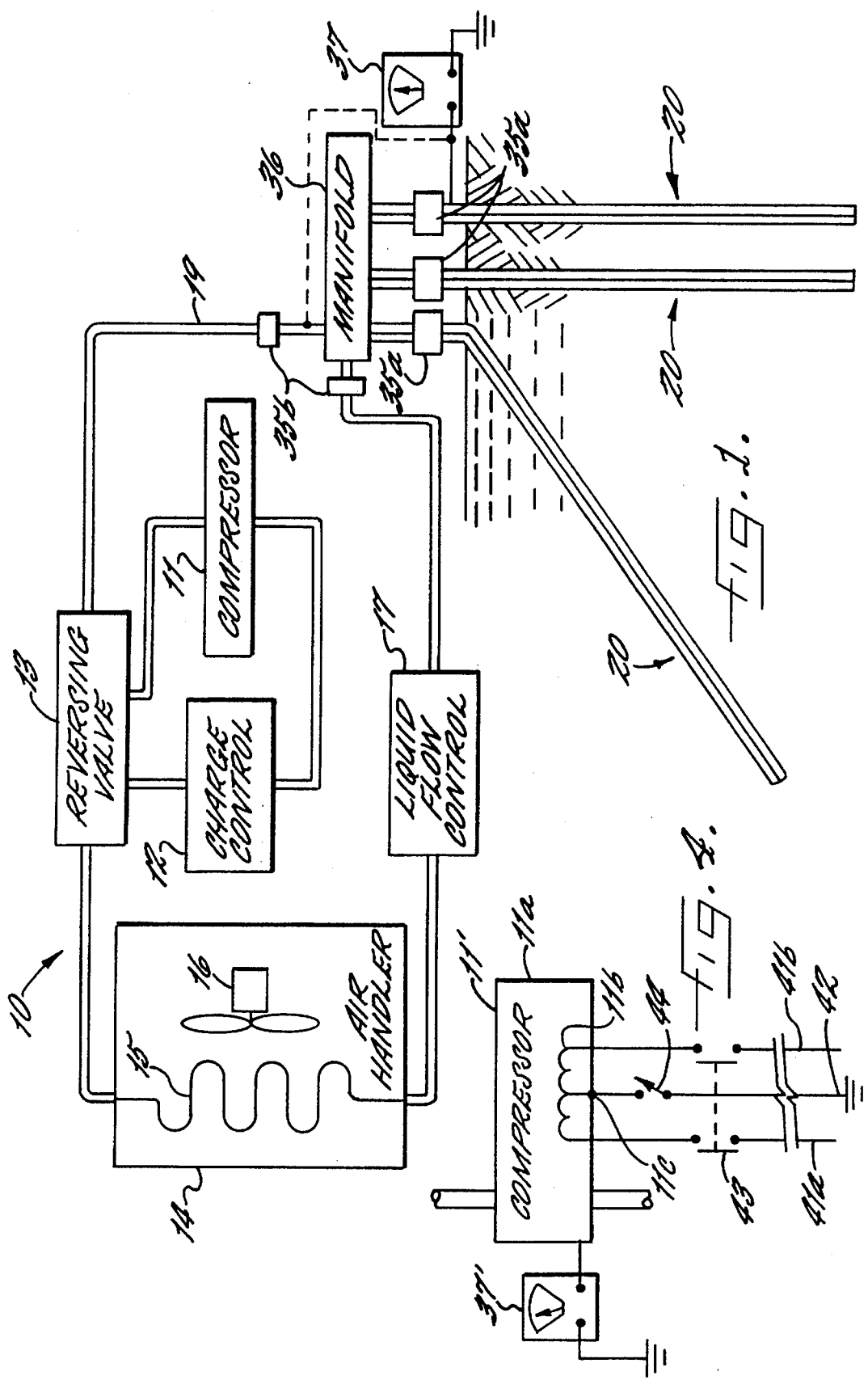
FIG. 1 is a schematic diagram illustrating a heat pump apparatus and including a plurality of earth tap heat exchangers in accordance with the invention.
Figure 2:
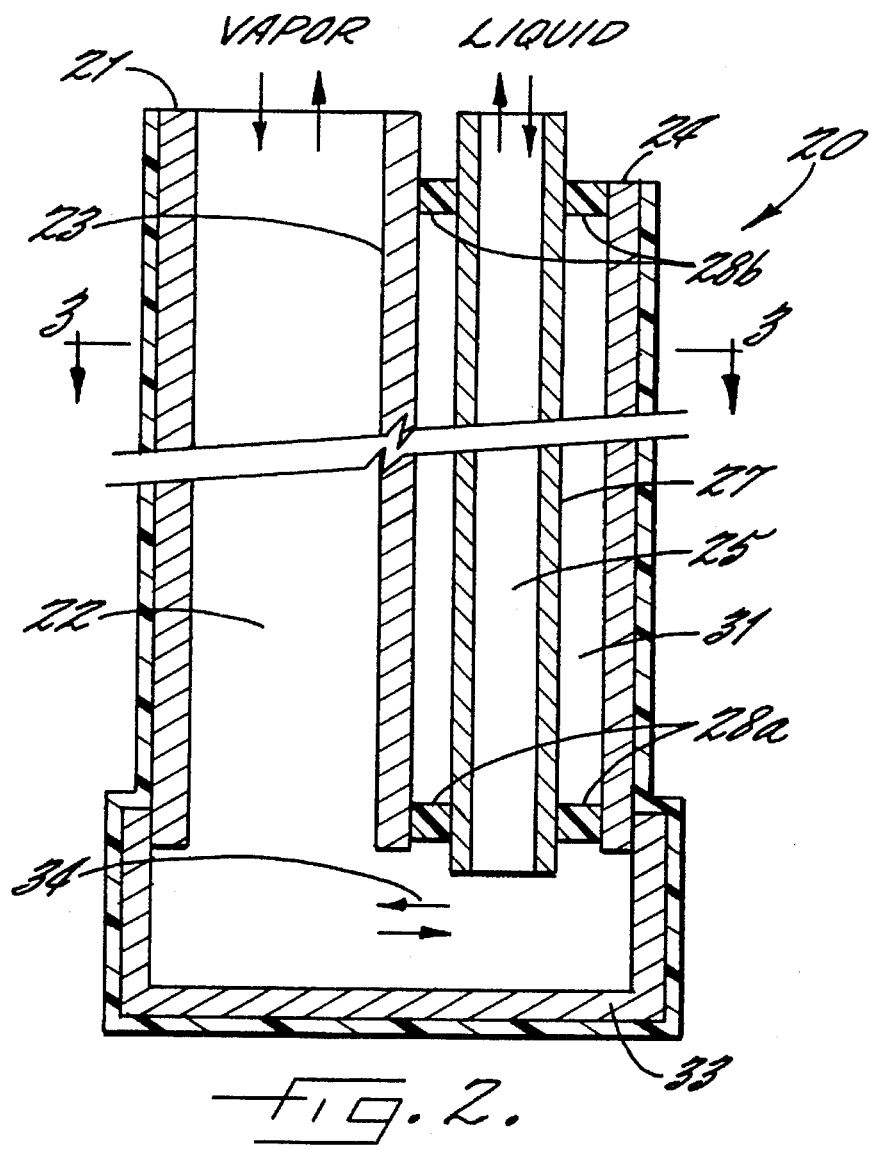
FIG. 2 is a longitudinal cross-sectional view of one embodiment of the earth tap heat exchanger according to the invention.
Figure 3:
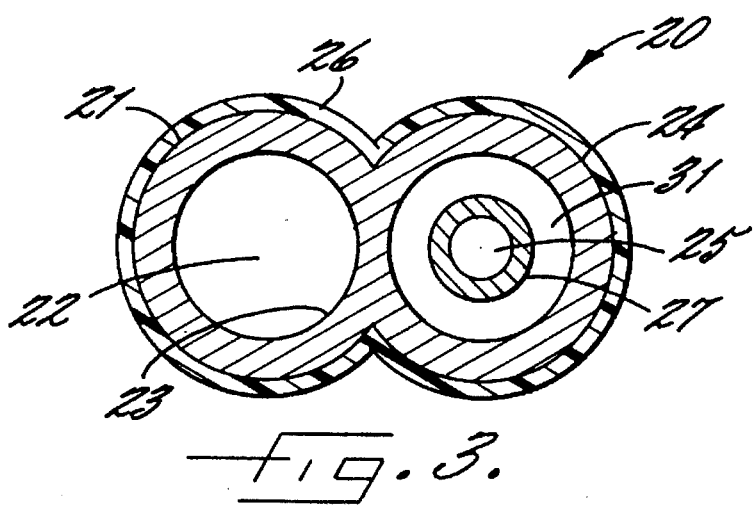
FIG. 3 is a cross-sectional view taken along lines 3—3 of FIG. 2.

Referring generally to the drawing FIGS. 1–3, a first embodiment of the heat pump apparatus 10 and including the earth tap heat exchanger 20 in accordance with the invention is described. The heat pump apparatus includes an air handler 14 including a blower 16 and a first heat exchanger 15 as would be readily understood by those skilled in the art. In addition, the illustrated heat pump apparatus 10 includes a compressor 11, refrigerant charge control device 12 and liquid flow control device 17 as described in U.S. Pat. Nos. 4,665,716 and 4,573,327, assigned to the assignee of the present invention, and the entire disclosures of which are incorporated herein by reference.

The charge control device 12 may preferably be capable of maintaining a desired quantity of refrigerant in active circulation within the heat pump apparatus. In addition, the liquid flow control device 17 may preferably be a float-type liquid flow control valve. A conventional accumulator may also be used as a charge control device 12, and other conventional valves or liquid metering means may be used as the liquid flow control device 17.

As would also be readily understood by those skilled in the art, the compressor 11 circulates refrigerant through the first heat exchanger 15 and through the plurality of earth tap heat exchangers 20 via the illustrated manifold 36. In addition, the illustrated heat pump apparatus 10 includes a conventional reversing valve 13 for permitting selective operation of the apparatus in either a heating or cooling mode, as would be readily understood by those skilled in the art.

The earth tap heat exchanger 20 is connected in fluid communication with a liquid line 18 and a vapor line 19 in the illustrated embodiment which serve as inlet and outlet lines. A plurality of earth tap heat exchangers 20 are shown in the illustrated embodiment, however, a heat pump apparatus including a single earth tap heat exchanger is also contemplated by the present invention. The earth tap heat exchanger 20 may be buried in soil, positioned partly in water and soil, or positioned entirely in a body of water if nearby. In other words, the earth tap heat exchanger 20 may be positioned in soil or water.

As shown in FIGS. 2 and 3, the illustrated earth tap heat exchanger 20 includes a plurality of earth contacting tubes connected together for positioning in soil or water. Each of the plurality of earth contacting tubes preferably comprises thermally conductive material which is also electrically conducting, such as copper, to transfer heat with surrounding earth or water and with an adjacent earth contacting tube. As shown in the illustrated embodiment, a first earth contacting tube 21 has an interior defining a vapor refrigerant passageway 22. A second earth contacting tube 24 is connected in side-by-side relation to the first earth contacting tube 21 and provides additional heat transfer with the first earth contacting tube, so that heat can be additionally transferred between refrigerant vapor passing within the vapor refrigerant passageway 22 and the earth or water surrounding the second earth contacting tube.

Liquid refrigerant insulated passageway defining means is positioned within the second earth contacting tube 24 for defining a liquid refrigerant passageway 25 extending within the second earth contacting tube and being thermally insulated therefrom. The liquid refrigerant passageway 25 and the vapor refrigerant passageway 22 are connected together in fluid communication.

In the illustrated embodiment of the earth tap heat exchanger 20, the liquid refrigerant insulated passageway defining means comprises a liquid refrigerant carrying tube 27 positioned within the second earth contacting tube 24 and in spaced relation therefrom. More particularly, annular sealing rings 28a, 28b may be provided within upper and lower ends of the second earth contacting tube and cooperate with adjacent portions of the liquid refrigerant carrying tube to define an enclosed space 31. Accordingly, a vacuum, gas, or gas mixture may be retained within the enclosed space 31 to provide thermal insulation for the liquid refrigerant passageway 25. In addition, a solid layer of insulating material may surround the liquid carrying tube 27 in place of the vacuum or gas, in which case the sealing rings may not be required. The insulation material may be a foam insulation or other insulating material as would be readily understood by those skilled in the art.

The first and second earth contacting tubes have closed lower ends 33, and an opening 34 adjacent lower ends thereof to connect the vapor refrigerant passageway 22 and the liquid refrigerant passageway 25 in fluid communication. Other configurations for connecting the vapor refrigerant passageway 22 and liquid refrigerant passageway 25 in fluid communication are also contemplated by the invention and will be readily appreciated by those skilled in the art.

The plurality of earth contacting tubes 21, 24 are preferably integrally formed into a monolithic unit so that adjacent earth contacting tubes share a common lengthwise extending wall portion 23 as shown in the illustrated embodiment. The earth contacting tubes 21, 24 may be extruded together as would be readily understood by those skilled in the art. The extruded embodiment may be readily formed and thereby avoid additional labor as may be necessary to align and weld discrete tubes, for example.

When the heat pump apparatus 10 is operating in the heating mode, liquid refrigerant is delivered to the upper end of the liquid carrying tube 27 and proceeds downward therethrough, and enters the lower end portion of the vapor refrigerant passageway 22. The liquid refrigerant evaporates within the vapor refrigerant passageway 22, thereby extracting heat from the soil or water surrounding both the first and second earth contacting tubes 21, 24. In other words, soil or water contact relative to the amount of material used to construct the earth tap 20 is increased so that, for example, a reduced amount of material may be used thereby reducing the initial cost.

When the heat pump apparatus 10 is used for cooling, hot refrigerant vapor is delivered to the upper end of the vapor refrigerant passageway 22, flows downward therethrough and condenses to liquid, which, in turn, is withdrawn from the liquid carrying tube 27. The hot vapor transfers heat to the earth surrounding both the first and second earth contacting tubes 21, 24.

The illustrated earth tap heat exchanger 20 has the advantage in that it may operate efficiently in the Cooling mode, as the insulating medium provides thermal insulation between the refrigerant liquid and the hot second earth contacting tube 24. In other terms, the present invention avoids thermal short circuiting. The illustrated earth tap heat exchanger 20 has an advantage in that less material, such as copper, is required for a given amount system capacity. These and other advantages and embodiments are described in greater detail in U.S. patent application entitled "Heat Pump Apparatus Having Earth Tap Heat Exchanger", assigned to the assignee of the present invention, and having Ser. No. 08/432,668 filed on May 2, 1995; the entire disclosure of which is incorporated herein by reference in its entirety.

As shown, the earth tap heat exchanger 20 further includes an electrically insulating layer 26 covering an exterior of the side-by-side tubes 21, 24. The electrically insulating layer is preferably a varnish, rubber, plastic such as a polymer or copolymer which is electrically insulating, resistant to chemical attack, and rugged to avoid damage during installation. For example, the insulating layer 26 may comprise high density polyethylene, or vinyl chloride, such as vinylidene chloride copolymer. In addition, the electrically insulating layer 26 is preferably a relatively good thermal conductor as compared to an oxide layer that may otherwise form on the exterior of tubes 21, 24. The electrically insulating layer 26 is also relatively thin, on the order of 0.002 to 0.050 inches to further ensure good thermal conductivity with the surrounding soil.

The electrically insulating layer 26 protects the underlying tubing 21, 24, from corrosion and may greatly extend the life of such tubing in acidic soil regions or regions where sulphur compounds are in the soil, for example. The electrically insulating layer 26 also protects the tubing when the earth tap is positioned in water, and particularly brackish water. In addition, the protective coating may permit other materials to be used for the tubes which are stronger or less expensive than copper as is commonly used in conventional earth taps. For example, steel or aluminum may be used for the electrically conductive tubing of the earth tap heat exchanger. The corrosion resistance provided by the electrically insulating layer 26, may also make possible a thinner wall thickness for the tubing thereby reducing the cost of the earth tap heat exchanger 20.

Turning now to FIG. 4, another embodiment of the invention is explained. The compressor 11' typically includes a housing 11a enclosing an electrical motor illustrated schematically by windings 11b. As would be readily understood by those skilled in the art, the motor 11b is typically powered by an electrical service including two power conductors 41a, 41b, and a ground conductor 42. A contactor 43 operates to open or close the connections between the motor and the conductors 41a, 41b. In addition, the ground conductor 42 is also connected to the compressor housing 11a as indicated schematically by point and is also electrically connected to earth taps 20 via lines 18, 19 and the manifold 36 in an embodiment not including either variation of the dielectric couplings 35a, 35b. Although the ground connection is not typically switchable, this embodiment of the present invention provides electrical isolation means in the form of a switch or removable link 44. The switch or link 44 may be temporarily opened to facilitate measurement of the resistance of the earth tap heat exchangers 20 by the illustrated ohm-meter 37'.

A method of the present invention is for determining whether an earth tap 20 has been damaged as in shipping or installation, and for identifying a leaking earth tap heat exchanger from among a plurality of earth tap heat exchangers 20 by measuring an electrical resistance between the electrically conducting tubing 21, 24 of an earth tap heat exchanger and the soil to determine if a portion of an electrically insulating layer 26 is damaged or otherwise has an undesired opening therein so that the electrically conducting tubing is exposed as indicated by a relatively low electrical resistance. As described above, each earth tap heat exchanger 20 preferably comprises electrically conducting tubing 21, 24 having an electrically insulating layer 26 covering an exterior thereof and being buried in soil or water. The measuring of the electrical resistance is preferably repeated for each of the earth tap heat exchangers.

The penetration or damage of a portion of the electrically insulating layer 26 exposing the electrically conducting tubing causes ohm-meter 37 to indicate that a leak has occurred or that the underlying tubing is exposed to the soil or water and may be subject to corrosion and, therefore, possible development of a leak. If a leak in the heat pump apparatus 10 has already been determined, such as by a loss of refrigerant, and only one earth tap exhibits low resistance, the leaking earth tap is identified by the low resistance. If several earth taps have low resistance, it may be desirable to further pressure test each such earth tap heat exchanger to identify the leaking earth tap, or each earth tap heat exchanger having a relatively low resistance may be repaired or replaced. In either case, the task of identifying the leaking earth tap heat exchanger 20 is greatly facilitated in accordance with the present invention.

The integrity of the electrically insulating layer 26 may also be of interest in performing maintenance testing and especially upon completing an initial installation. Manufacturing, shipping or initial installation of an earth tap 20 may result in a scratch, nick, or tear in the electrically insulating layer 26 thereby forming an undesired opening in the insulating layer. Other forms of damage may include, for example, a burning of a portion of the insulating layer thereby producing a carbonized portion which may be considered to produce an opening in the insulating layer. If the integrity of the electrically insulating layer 26 is compromised, corrosion may be accelerated leading to premature failure of the earth tap heat exchanger 20. In other words, the present invention provides a way of detecting a problem and correcting the problem instead of unknowingly proceeding with a defective or soon to be defective earth tap heat exchanger 20.

The step of measuring the electrical resistance preferably comprises electrically connecting a conventional resistance measuring meter 37 (FIG. 1) between an electrical ground and the electrically conducting tubing 21, 24 of an earth tap heat exchanger 20 being measured. The method also preferably includes the step of electrically isolating the electrically conducting tubing of the earth tap heat exchanger from other portions of the heat pump apparatus 10 before the step of measuring electrical resistance. In addition, the step of electrically isolating the electrically conducting tubing preferably comprises positioning dielectric coupling means such as respective pairs of conventional dielectric couplings 35a schematically illustrated in FIG. 1, between the electrically conducting tubing and adjacent fluid lines, such as at the manifold 36 as shown in the illustrated embodiment.

Alternatively, the number of required dielectric couplings may be reduced by positioning a single dielectric coupling 35b in each fluid line 18, 19. Accordingly, the initial installation cost is reduced-and the potential leakage areas are also reduced. In this configuration, each of the earth tap heat exchangers 20 are preferably individually tested after positioning in the soil or water, and before connection to the manifold 36. If a loss of performance is determined during the service life of the heat pump apparatus 10, the underground portion of the apparatus may be readily tested as an entity since all of the earth taps 20 are electrically connected together at the manifold 36. If the integrity of the earth tap heat exchangers 20 tests good, a service technician can then troubleshoot the above ground portions of the heat pump apparatus 10 for any leaks.

Yet another alternative for electrically isolating the earth tap heat exchangers 20 includes opening a ground switch or link 44 (FIG. 4) to thereby isolate the heat pump apparatus from the electrical ground 42 which typically connects the heat pump apparatus to ground in an electrical connection box, for example, and schematically represented at the electrical motor 11b and compressor housing 11a of the heat pump.

Another method aspect of the present invention is for installing a heat pump apparatus 10 and comprises the steps of: providing at least one earth tap heat exchanger 20 comprising electrically conducting tubing 21, 24 having an electrically insulating layer 26 covering an exterior thereof; positioning the earth tap heat exchanger in soil or water; connecting at least one earth tap heat exchanger 20 in fluid communication with adjacent fluid lines; and providing electrical isolation means for the earth taps.

The earth tap heat exchanger may be electrically isolated by positioning respective dielectric couplings between the electrically conducting tubing of the earth tap heat exchanger and the adjacent fluid lines. As described above, the dielectric couplings 35a, 35b may be positioned in fluid lines 18, 19 or on the opposite side of the manifold 36. Alternatively, the electrical isolation may be achieved by opening the ground switch 44 as described above.

The present invention is preferably implemented in a ground-coupled direct expansion heat pump apparatus 10 as described above. In addition, the earth tap heat exchanger 20 preferably further comprises electrical contact means for facilitating electrical connection to the electrically conducting tubing 21, 24 as may be provided by leaving a portion of the electrically conducting tubing exposed above the surface of the soil or water to facilitate access thereto. Accordingly, measuring an electrical resistance between the electrically conducting tubing 21, 24, and the soil or water by way of an electrical ground is readily performed.

In the preceding portions of the description the various features and aspects of the present invention have been explained with reference to a ground-coupled direct expansion heat pump apparatus including one or more earth tap heat exchangers comprising a plurality of earth contacting tubes 21, 24 and 20 connected together in side-by-side relation. Those of skill in the art will readily appreciate that the invention has applicability to U-shaped tube earth tap heat exchangers, and also coaxial and other earth tap heat exchangers which comprise electrically conducting tubing, any of which may be coated with an electrically insulating layer as described above. In addition, various aspects and features of the invention may also have applicability to other ground-coupled heat earth tap heat exchangers, such as for closed loop heat pumps.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for testing integrity of an electrically insulating layer of an earth tap heat exchanger of a heat pump apparatus, the earth tap heat exchanger comprising electrically conducting tubing having the electrically insulating layer covering an exterior thereof and being positioned in soil or water, the method comprising the steps of:

measuring an electrical resistance between the electrically conducting tubing and the soil or water; and determining, based upon the measured electrical resistance, if the electrically insulating layer has an undesired opening in a portion thereof thereby exposing an adjacent portion of the electrically conducting tubing to the soil or water as indicated by a relatively low electrical resistance measurement.

2. A method according to claim 1 wherein the step of measuring the electrical resistance comprises electrically connecting a resistance measuring meter between an electrical ground and the electrically conducting tubing.

3. A method according to claim 2 further comprising the step of electrically isolating the electrically conducting tubing of the earth tap heat exchanger before the step of measuring electrical resistance.

4. A method according to claim 3 wherein the step of electrically isolating the electrically conducting tubing comprises operatively connecting dielectric couplings between the electrically conducting tubing and adjacent fluid lines.

5. A method according to claim 3 wherein the step of electrically isolating the electrically conducting tubing comprises opening an electrical ground connection to the heat pump apparatus.

6. A method according to claim 1 wherein the heat pump apparatus is a direct expansion heat pump apparatus.

7. A method for installing a ground-coupled heat pump apparatus comprising the steps of:

providing at least one earth tap heat exchanger comprising electrically conducting tubing having an electrically insulating layer covering an exterior thereof;

positioning the at least one earth tap heat exchanger in soil or water;

connecting the at least one earth tap heat exchanger in fluid communication with associated fluid lines of the heat pump apparatus; and providing electrical isolation means for electrically isolating the at least one earth tap heat exchanger from electrical ground.

8. A method according to claim 7 further comprising the step of measuring an electrical resistance between the electrically conducting tubing of the earth tap heat exchanger and the soil or water to determine if the electrically insulating layer has an undesired opening in a portion thereof so that an adjacent portion of the electrically conducting tubing is exposed to the soil or water as indicated by a relatively low electrical resistance.

9. A method according to claim 8 wherein the step of measuring the electrical resistance comprises electrically connecting a resistance measuring meter between an electrical ground and the electrically conducting tubing.

10. A method according to claim 8 wherein the electrical isolation means comprises a ground switch connecting a portion of the heat pump apparatus to an electrical ground; and further comprising the step of opening the ground switch to electrically isolate the electrically conducting tubing of the earth tap heat exchanger before the step of measuring electrical resistance.

11. A method according to claim 7 wherein the step of providing electrical isolation means comprises the step of operatively connecting dielectric couplings between the electrically conducting tubing and adjacent fluid lines.

12. A method according to claim 7 wherein the at least one earth tap heat exchanger comprises a plurality of earth tap heat exchangers; and wherein the step of providing electrical isolation means further comprises the step of connecting the plurality of earth tap heat exchangers via a manifold to inlet and outlet fluid lines of the heat pump apparatus with a dielectric coupling in each of the inlet and outlet fluid lines.

13. A method for identifying a leaking earth tap heat exchanger among a plurality of earth tap heat exchangers in a heat pump apparatus, each earth tap heat exchanger comprising electrically conducting tubing having an electrically insulating layer covering an exterior thereof and being positioned in soil or water, the method comprising the steps of:

measuring an electrical resistance between the electrically conducting tubing of an earth tap heat exchanger and the soil or water to determine if the electrically insulating layer has an undesired opening in a portion thereof so that an adjacent underlying portion of the electrically conductive tubing is exposed to the soil or water as indicated by a relatively low electrical resistance; and repeating the measuring of the electrical resistance for each of the plurality of earth tap heat exchangers.

14. A method according to claim 13 wherein the step of measuring the electrical resistance comprises electrically connecting a resistance measuring meter between an electrical ground and the electrically conducting tubing of an earth tap heat exchanger being measured.

15. A method according to claim 13 further comprising the step of electrically isolating the electrically conducting tubing of the earth tap heat exchanger from other portions of the heat pump apparatus before the step of measuring electrical resistance.

16. A method according to claim 15 wherein the step of electrically isolating the electrically conducting tubing comprises operatively connecting dielectric couplings between the electrically conducting tubing and adjacent fluid lines.

17. A method according to claim 15 wherein the step of electrically isolating the electrically conducting tubing comprises opening an electrical ground connection to the heat pump apparatus.

18. A method according to claim 13 wherein the heat pump apparatus is a direct expansion heat pump apparatus.

19. A ground-coupled direct expansion heat pump apparatus comprising:

a first heat exchanger;

at least one earth tap heat exchanger for positioning in soil or water and comprising electrically conductive tubing and an electrically insulating layer covering an exterior thereof;

electrical isolation means for electrically isolating the at least one earth tap heat exchanger from electrical ground for permitting measurement of an electrical resistance between the electrically conducting tubing and the soil or water to determine if the electrically insulating layer has an undesired opening in a portion thereof thereby exposing an adjacent portion of the electrically conducting tubing to the soil or water as indicated by a relatively low electrical resistance measurement; and a compressor for circulating refrigerant through said first heat exchanger and said at least one earth tap heat exchanger.

20. A heat pump apparatus according to claim 19 wherein said electrical isolation means comprises dielectric coupling means for connecting said at least one earth tap heat exchanger in fluid communication with associated fluid lines and for electrically isolating the at least one earth tap heat exchanger therefrom.

21. A heat pump apparatus according to claim 20 further comprising an inlet fluid line and an outlet fluid line connected in fluid communication with said at least one earth tap heat exchanger, and wherein said dielectric coupling means comprises a dielectric coupling connected in each of said inlet and outlet fluid lines.

22. A heat pump apparatus according to claim 19 wherein said electrical isolation means comprises a ground switch connecting portions of the heat pump apparatus to electrical ground when in a closed position, and electrically isolating the at least one earth tap heat exchanger from electrical ground when in the open position.

23. A heat pump apparatus according to claim 19 wherein said at least one earth tap heat exchanger further comprises electrical contact means for facilitating electrical connection to the electrically conducting tubing.

24. A heat pump apparatus according to claim 23 further comprising a resistance measuring meter operatively connected between an electrical ground and said electrical contact means.

25. A heat pump apparatus according to claim 19 wherein said electrically conducting tubing comprises copper.

26. A heat pump apparatus according to claim 19 wherein said electrically insulating layer is a polymer being relatively thin so as to permit thermal conduction between surrounding soil and underlying portions of the electrically conductive tubing.

27. A heat pump apparatus according to claim 26 wherein said polymer comprises one of polyethylene and vinyl chloride.

28. An earth tap heat exchanger for being positioned in soil or water and connected to associated fluid lines of a heat pump apparatus, said earth tap heat exchanger comprising:

electrically conductive tubing and an electrically insulating layer covering an exterior thereof; and dielectric coupling means connected to said electrically conductive tubing for connecting the earth tap heat exchanger in fluid communication with associated fluid lines while electrically isolating the earth tap heat exchanger therefrom.

29. An earth tap heat exchanger according to claim 28 further comprising electrical contact means for facilitating electrical connection to the electrically conducting tubing so as to permit measuring an electrical resistance between the electrically conducting tubing and the soil or water for determining, based upon the measured electrical resistance, if the electrically insulating layer has an undesired opening in a portion thereof thereby exposing an adjacent portion of the electrically conducting tubing to the soil or water as indicated by a relatively low electrical resistance measurement.

30. An earth tap heat exchanger according to claim 28 wherein said electrically conducting tubing comprises copper.

31. An earth tap heat exchanger according to claim 28 wherein said electrically insulating layer is a polymer being relatively thin so as to permit thermal conduction between surrounding soil and underlying portions of the electrically conductive tubing.

32. An earth tap heat exchanger according to claim 31 wherein said polymer comprises one of polyethylene and vinyl chloride.

* * * * *